Nov. 24, 1931.  G. G. MASEK  1,832,993
HEDGE CUTTER
Filed Nov. 26, 1929  2 Sheets-Sheet 2
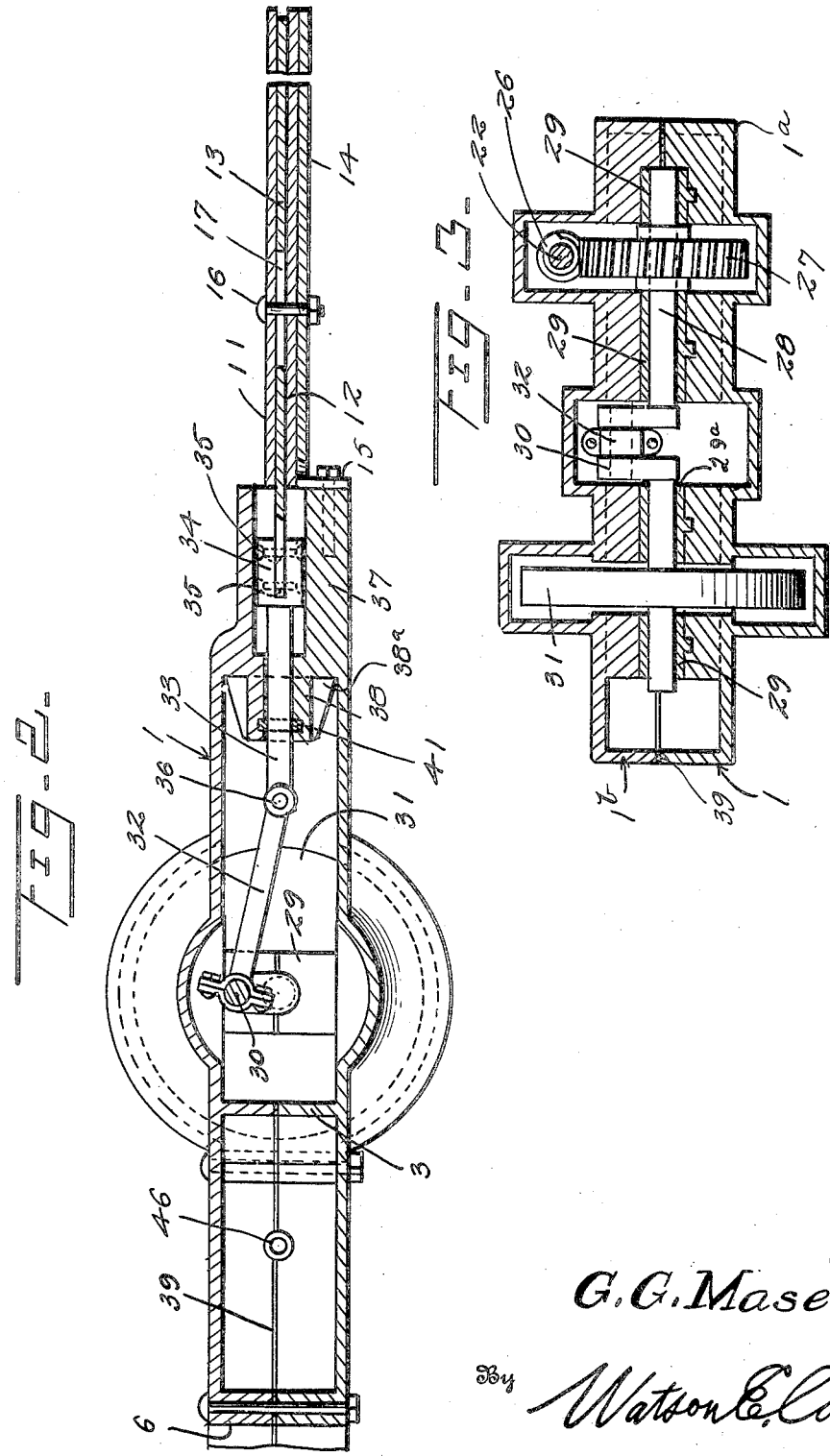
Inventor
G. G. Masek
By Watson E. Coleman
Attorney Patented Nov. 24, 1931

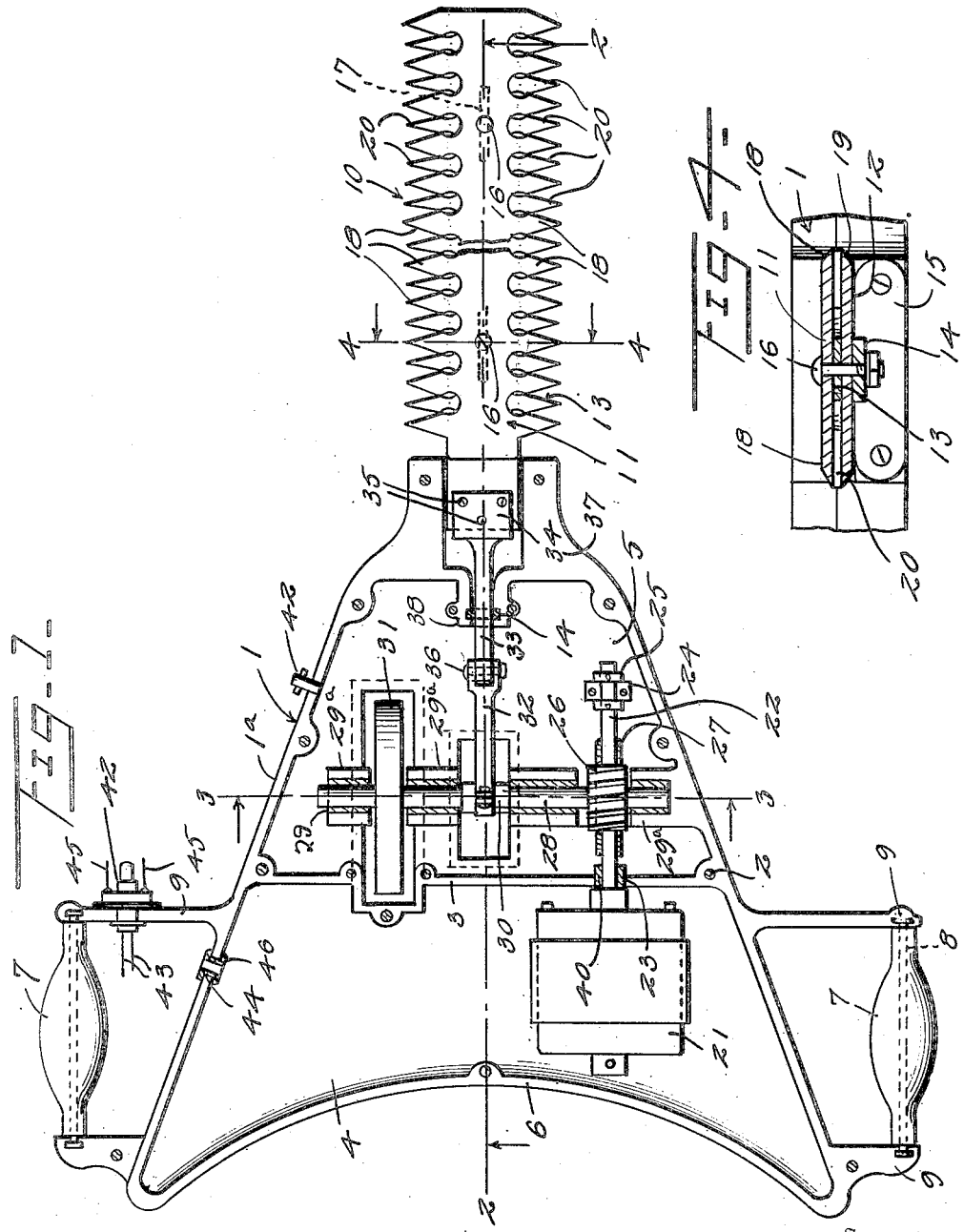

1,832,993

UNITED STATES PATENT OFFICE

GEORGE G. MASEK, OF CHICAGO, ILLINOIS, ASSIGNOR TO GEORGE C. HILTON, OF CHICAGO, ILLINOIS

HEDGE CUTTER

Application filed November 26, 1929. Serial No. 409,917.

This invention relates to motor operated hedge cutters, and has for one of its objects to provide a novel machine of this character which shall embody a cutting mechanism adapted to be moved forwardly and rearwardly and from right to left at the top of the hedge, adapted to be moved upwardly and downwardly and swung from right to left at the sides of the hedge, and adapted during each of said movements thereof to cut the hedge.

The invention has for a further object to provide a machine of the character stated which shall embody a support through the medium of which the cutting mechanism may be conveniently manipulated in the manner stated.

The invention has for a further object to provide a machine of the character stated wherein the cutting machine shall extend longitudinally from one end of the support, wherein the support shall be provided at its other end with a breast plate, and wherein the support shall be provided at its opposite sides and adjacent the breast plate with hand grips, to the end that the cutting machine may be conveniently manipulated in the manner stated.

The invention has for a further object to provide a machine of the character stated wherein the support shall be of hollow formation so as to constitute a housing for a motor and means for establishing an operative connection between the motor and cutting mechanism and wherein the housing shall be adapted to permit said means to be packed in grease.

The invention has for a still further object to provide a machine of the character stated wherein the several parts thereof may be readily assembled and disassembled, which shall be simple and durable, and which may be manufactured and sold at a comparatively low cost.

The invention is hereinafter fully described and claimed, and illustrated in the accompanying drawings, wherein:

Figure 1 is a top plan view of the hedge cutter with the upper section of the support removed;

Figure 2 is a section taken on the plane indicated by the line 2—2 of Figure 1;

Figure 3 is a section taken on the plane indicated by the line 3—3 of Figure 1, and Figure 4 is a section taken on the plane indicated by the line 4—4 of Figure 1.

Referring in detail to the drawings, 1 designates the support of the hedge cutter. The support 1 is of hollow formation and gradually decreases in width in the direction of its front end. The support 1 which consists of similar lower and upper sections $1^a$ and $1^b$ secured together by screws 2, is separated by a partition 3 into a rear compartment 4 and a front compartment 5. The rear end of the support 1 is of concave formation to provide a breast plate 6, and hand grips 7 are mounted upon the support 1 at the lateral sides of the rear portion thereof. The hand grips 7 extend forwardly and rearwardly of the support 1, and are fixedly secured upon bars 8 which are in turn fixedly secured to bracket lugs 9 extending laterally from the support.

The cutting mechanism 10 extends forwardly from the front end of the support 1, and comprises lower and upper stationary blades 11 and 12, respectively, and a movable blade 13 which is arranged between the stationary blades. The blades 11, 12 and 13 are supported by an arm 14 which extends forwardly from the front end of the support 1, and is fixed to said end thereof, as at 15. The blades 11 and 12 are fixed to the arm 14 by screws 16 which pass through longitudinal slots 17 in the blade 13 to slidably connect this blade to the others. The blades 11 and 12 are provided at their side edges with their cutting teeth 18 and 19, respectively, and the blade 13 is provided at its side edges with cutting teeth 20. The teeth 18, 19 and 20 which are of V-form in plan and have their inwardly diverging edges sharpened, are connected to the blades by shanks having concave and sharpened edges.

An electric motor 21 is arranged within the compartment 4 of the support 1, and is secured to the lower section $1^a$ of the support. The armature shaft 22 of the motor 1 extends forwardly through an opening 23 in the partition 3, and has its front end journaled in a bearing 24 arranged within the front compartment 5 of the support 1. Collars 25 secured to the shaft 22 at opposite sides of the bearing 24 limit the endwise movement of the shaft. A worm gear 26 fixed to the shaft 22, meshes with a worm gear 27 fixed to a shaft 28. The shaft 28 is journaled in a series of alined bearings 29 extending transversely of the support 1 and arranged within the compartment 5. The bearings 29 are arranged in relatively spaced relation, and the worm gear 27 is arranged between a pair of the bearings. The shaft 28 is provided with a crank 30 which is arranged between a pair of the bearings 29, and it is also provided with a balance wheel 31 which is arranged between a pair of the bearings 29. The motor 21 and shaft 22 are arranged at one side of and parallel to the longitudinal center of the support 1, the shaft 28 is arranged at right angles to said center, and the balance wheel 31 is arranged at the other side of said center, whereby to provide a well balanced hedge cutter. The cutting mechanism 10 and the crank 30 are arranged at the longitudinal center of the support 1, and the crank 30 is connected by a rod 32 to an arm 33 extending rearwardly from the movable blade 13. The arm 33 is provided with a broad, flat head 34 which is secured to the rear end of the movable blade 13 by screws 35, and the connecting rod 13 is pivoted, as at 36, to the rear end of the arm.

The support 1 is provided in its front end with a forwardly directed bearing 37 for the rear end portion of the movable blade 13, and it is provided at said end thereof with a rearwardly directed bearings 38 for the arm 33. The partition 3, and the bearings 24, 29, 37 and 38 are of sectional formation, the lower sections thereof being carried by the lower support section 1ª, and the upper sections thereof being carried by the upper support section 1ᵇ. The front compartment 5 of the support 1 is adapted to contain grease and to maintain the grease therein, a gasket 39 is arranged between the support sections 1ª and 1ᵇ, a gasket 40 is arranged in the opening 23 about the shaft 22, and a gasket 41 is arranged in the bearing 38 about the arm 33. The support 31 is provided at one of its sides with a grease nipple 42 to permit its compartment 5 to be supplied with grease.

The support sections 1ª and 1ᵇ are die-casted, and are provided with bearing supports which are casted therewith. The bearings are formed of bearing metal and casted around the bearing supports, and they are provided with pilots to hold them from angular and endwise movement with respect to the bearing supports. The worm 26 and worm gears 27 are made of bronze and the collars 25 are made of brass. The shafts 22 and 28 and the blade support 14 are made of semi-steel. The balance wheel 31 is made of soft metal, and the blades 11, 12 and 13 are made of hardened steel, the hand grips 7 being made of wood.

One of the hand grips supporting lugs 9 is provided with a switch 42 which is of the push button type. The switch 42 is connected to the motor 21 by leads 43 which extend through an opening 44 in the support 1, and it is connected to a source of current by leads 45. The leads 43 and 45 are suitably insulated, and an insulating bushing 46 is arranged within the opening 44.

It will be understood that, as the blades 11, 12 and 13 are provided at both sides thereof with cutting teeth, the machine is adapted to be moved forwardly and rearwardly and from right to left at the top of the hedge, is adapted to be moved upwardly and downwardly and swung from right to left at the sides of the hedge, and will, during each of such movements thereof, cut the hedge. As the rear edge 6 of the support 1 is of arcuate formation, the machine may be held at the rear end of the support against the shaft during the cutting of the top of the hedge. The location of the hand grips 7 permits the machine to be conveniently supported in this manner. Due to the arrangement of the motor 21 and balance wheel 31 at opposite sides of the longitudinal center of the machine, the cutting mechanism may be easily supported in the desired position. As the blades 11, 12 and 13 are secured to their support 14 by the screws 16, and as the blade 13 is secured to the arm 33 by the screws 35, any or all of these blades may be readily removed and a new blade or blades readily substituted therefor. As the support sections 1ª and 1ᵇ are connected together by the screws 13, they may be readily separated, and when separated all parts within the support are readily accessible for adjustment, repairs or replacement.

The head 34 has a snug sliding fit in the bearing 37. The bearing 38 is provided with reinforcing ribs 38ª formed integrally therewith and with the support sections 1ª and 1ᵇ. Any suitable means may be used to fixedly secure the hand grip 7 to the bars 8 and to fixedly secure the bars to the bracket lugs 9.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

A hedge cutter comprising a substantially triangular-shaped support having a concave base, a pair of outstanding handle arms secured to each of the outwardly converging sides of said support in parallel relation to each other, a handle disposed between each pair of said arms and mounted in parallel relation to the longitudinal axis of said support, an upper and a lower cutter blade fixedly secured to the apex of said support and extending outwardly thereof, a movable cutter blade slidably disposed between said fixed blades, a plurality of V-shaped teeth secured to each side of said fixed and movable blades, said teeth terminating at the inner ends thereof in curved portions, and operating means for said movable blade secured to said support.

In testimony whereof I hereunto affix my signature.

GEORGE G. MASEK.